United States Patent
Ewert

(10) Patent No.: US 11,338,817 B2
(45) Date of Patent: May 24, 2022

(54) DETECTION OF A DECREASING PERFORMANCE OF A SENSOR

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 16/524,411

(22) Filed: Jul. 29, 2019

(65) Prior Publication Data
US 2020/0039528 A1 Feb. 6, 2020

(30) Foreign Application Priority Data

Jul. 31, 2018 (DE) .......................... 102018212733.6

(51) Int. Cl.
| | |
|---|---|
| *B60W 50/02* | (2012.01) |
| *G07C 5/08* | (2006.01) |
| *G05D 1/02* | (2020.01) |
| *G07C 5/00* | (2006.01) |
| *G05D 1/00* | (2006.01) |

(52) U.S. Cl.
CPC ....... *B60W 50/0205* (2013.01); *G05D 1/0088* (2013.01); *G05D 1/0214* (2013.01); *G07C 5/008* (2013.01); *G07C 5/0808* (2013.01); *B60W 2050/0215* (2013.01); *G05D 2201/0213* (2013.01)

(58) Field of Classification Search
CPC ..... B60W 50/0205; B60W 2050/0215; B60W 2556/45; B60W 60/00186; B60W 50/045; G07C 5/0808; G07C 5/008; G05D 1/0214; G05D 1/0088; G05D 2201/0213; G01S 17/931; G01S 15/86; G01S 15/931; G01S 13/86; G01S 7/497; G01S 7/52004; G01S 7/4021; G01S 7/4008; G01S 2013/9316; G01S 13/931
See application file for complete search history.

(56) References Cited

U.S. PATENT DOCUMENTS 10,507,841 B1 * 12/2019 Singh .................... B60W 30/18

\* cited by examiner

*Primary Examiner* — Michael V Kerrigan
(74) *Attorney, Agent, or Firm* — Norton Rose Fulbright US LLP; Gerard Messina

(57) ABSTRACT

A method for detecting a decreasing performance of at least one sensor is described, in particular in a vehicle, wherein a setpoint trajectory of the vehicle is calculated, the setpoint trajectory is driven by the vehicle or is simulated by an artificial intelligence, the actual trajectory driven by the vehicle or the simulated trajectory is compared with the setpoint trajectory, a performance of the at least one sensor is tested by the control unit if a deviation of the actual trajectory or the simulated trajectory from the setpoint trajectory is determined, in which test each sensor of the vehicle is alternately deactivated and with the aid of at least one alternative sensor the setpoint trajectory is driven by the vehicle or is simulated by an artificial intelligence. Furthermore, a control unit, a computer program and a machine-readable storage medium are described.

12 Claims, 2 Drawing Sheets

DETECTION OF A DECREASING PERFORMANCE OF A SENSOR

CROSS REFERENCE

The present application claims the benefit under 35 U.S.C. § 119 of German Patent Application No. DE 102018212733.6 filed on Jul. 31, 2018, which is expressly incorporated herein by reference in its entirety.

FIELD

The present invention relates to a method for detecting a decreasing performance of at least one sensor, in particular in a vehicle, as well as to a control unit, which is designed to implement the method. The present invention furthermore relates to a computer program and to a machine-readable storage medium.

BACKGROUND INFORMATION

Conventional vehicles capable of being automated have a multitude of sensors and in particular driving environment sensors. The vehicles capable of being automated may be autonomous or partially autonomous vehicles, for example. The sensors make it possible to scan and monitor the surroundings of the vehicle, which allows for automated navigation and control of the vehicles.

In the course of the life of a vehicle, the sensors may deteriorate with respect to their performance and the precision of detection of the vehicle surroundings. For example, a protective shield in front of a camera may become cloudy or yellow with increasing age. Furthermore, a driven mirror of a Lidar sensor, for example, may over time no longer rotate with an intended precision. In the event of an internal sensor error, sensors today already transmit error messages to a master control unit. This makes it possible to switch the sensors off in time and/or to replace them.

If the sensors are still functioning, but have a deteriorated performance or accuracy, no monitor inside the sensor will generate an error message. This is due to the fact that it is possible to operate the sensors even with a partial functionality, as a result of which they are internally not recognized as conspicuous. An increasing deterioration of the performance, however, may be critical for executing automated driving functions.

SUMMARY

An object of the present invention may be seen in particular as providing a method that allows for a reduction of the performance of a sensor to be detected in a timely manner.

This objective may achieved in accordance with example embodiments of the present invention. Advantageous developments of the present invention are described herein.

According to one aspect of the present invention, an example method is provided for detecting a decreasing performance of at least one sensor, in particular in a vehicle. In one step, a setpoint trajectory of the vehicle is calculated. The setpoint trajectory is driven by the vehicle or is simulated by an artificial intelligence. Subsequently, the actual trajectory driven by the vehicle or the simulated trajectory is compared to the setpoint trajectory. If a deviation of the actual trajectory or the simulated trajectory from the setpoint trajectory is determined, a performance of the at least one sensor is checked by the control unit in that each sensor of the vehicle is alternately deactivated and with the aid of at least one alternative sensor the setpoint trajectory is driven by the vehicle or is simulated by an artificial intelligence.

In one step, a setpoint trajectory of the vehicle is simulated by an artificial intelligence. The setpoint trajectory is subsequently driven by the vehicle. The actual trajectory driven by the vehicle is compared to the simulated setpoint trajectory. In particular, sensor data of the at least one sensor may be read out by a control unit and used to perform a comparison. If a deviation of the actual trajectory from the setpoint trajectory is determined, a performance of the at least one sensor is checked by the control unit in that each sensor of the vehicle is alternately deactivated and the setpoint trajectory is driven by the vehicle with the aid of at least one alternative sensor.

According to another aspect of the present invention, a control unit is provided for connecting to at least one sensor and for evaluating sensor data, the control unit being designed to perform all steps of the method according to the present invention.

Furthermore, according to one aspect of the present invention, a computer program is provided, which comprises instructions, which, when the computer program is executed by a computer or a control unit, prompt the latter to perform the method of the present invention.

According to another aspect of the present invention, a server unit having at least one memory is provided, the server unit being designed to connect to at least one vehicle and to perform all steps of the method of the present invention.

According to another aspect of the present invention, a machine-readable storage medium is provided, on which the computer program of the present invention is stored.

The vehicle may be a vehicle capable of being automated. Vehicles of this kind, in particular partially automated, highly automated or fully automated vehicles, have a multitude of such sensors. Vehicle sensors of this kind may be camera sensors, radar sensors, LIDAR sensors, ultrasonic sensors and the like. In particular, the sensors may be driving environment sensors, which are capable of detecting an environment of the vehicle and allowing the vehicle to be controlled within the environment. Furthermore, airbag sensors and ESP sensors such as rotation-rate sensors, acceleration sensors or pressure sensors may also be read out and monitored by a control unit.

Within the vehicle, it may be necessary, especially in the case of safety-critical functions, to detect in a timely manner a driving environment sensor that has a deteriorating performance in order to avoid serious accidents before the sensor generates an internal error or fails completely. The method of the present invention makes it possible so detect such a driving environment sensor of decreasing performance in a vehicle.

The at least one sensor transmits its sensor data within the vehicle to a master control unit, which may be responsible for performing at least one autonomous driving function within the vehicle. For example, the control unit may have one or more artificial intelligences for performing automated driving functions or automated driving. The driving environment sensors may be monitored continuously or when needed with respect to their performance.

The sensors preferably have a basic functionality, which is deteriorated, reduced or limited, however, relative to an original state. This may be for example a reduced range, a slower sampling rate, a lower resolution or a signal offset and the like. In this case, a monitor internal to the sensor is of no use since the sensor is still able to be operated with a partial functionality, as a result of which the sensor does not appear conspicuous internally. This deteriorated performance, however, is critical for performing an autonomous driving function.

According to one development of the present invention, the method for detecting a decreasing performance of a driving environment sensor is implemented with the aid of an artificial intelligence that is already used for automated driving. The performance of a driving environment sensor is monitored with the aid of an artificial intelligence that is already used for automated driving. For this purpose, the sensor data are processed by the respective artificial intelligence. The output of the artificial intelligence may be for example a planned trajectory or the activation of actuators of the vehicle.

The artificial intelligence calculates setpoint trajectories which the vehicle travels in a subsequent step as precisely as possible. Furthermore, it is possible to perform in parallel a simulation of the actuator activation within the artificial intelligence. Based on the simulation or the setpoint trajectory calculation, values are calculated for the outputs of the artificial intelligence, for example for controlling actuators. These calculated values at the output of the artificial intelligence are subsequently compared with setpoint values or with the sensor data of the sensors. For example, it is possible to ascertain in a simulation of the trajectory in another artificial intelligence within the autonomous vehicle where the vehicle is expected to be located after executing this planned trajectory. If the planned trajectory is completely implausible because the vehicle is no longer located on a road after executing the respective trajectory or has collided with another road user or a piece of infrastructure, then it is to be assumed that at least one driving environment sensor of the autonomous vehicle no longer functions properly.

Subsequently it is possible to perform an identification as to which of the sensors in the vehicle has a decreasing performance. For this purpose, for example, weather data may be requested from a cloud via a car-to-x communication link and transmitted to the vehicle. In a bad weather situation, for example, the performance of a camera may be inadequate. Fundamentally, in such a situation, the camera is probably not used for autonomous driving. The error may then reside, for example, in another driving environment sensor, in a radar sensor or a LIDAR sensor of the vehicle. In a further step, the control unit or the vehicle deactivates each individual driving environment sensor, it being possible to continue to operate the vehicle, for example on the shoulder of the road at low speed. It is possible to continue to investigate the calculated setpoint trajectory by simulation before executing it on the actuators and to determine the probable change in position of the vehicle with the aid of the artificial intelligence. The identification of a sensor of decreasing performance may thus be performed in analogy with a depth-first search, in which each sensor represents a path. If the change in position of the vehicle is plausible, the deactivated driving environment sensor is activated anew and the procedure is repeated. If there are greater position deviations between the simulation or the setpoint trajectory and the actual trajectory, which cannot be plausibilized, then the error lies in the reactivated driving environment sensor.

According to one specific embodiment, at least one sensor having a decreasing performance is deactivated by the control unit. The respective sensor that does not deliver the required performance may be permanently deactivated after identification. It is also possible that multiple driving environment sensors are defective at the same time, although the probability of this is low. Nevertheless, the other driving environment sensors may be checked as well. Subsequently, the autonomous driving function of the vehicle may be continued, if possible, with the remaining sensors. This may be done for example until a workshop is reached in which the defective driving environment sensor may be replaced. The vehicle and/or the control unit may have different artificial intelligences, which are responsible for autonomous driving or which are designed for a different number and type of driving environment sensors. In the event of a failure of radar sensors, for example, an artificial intelligence stored in a vehicle may be executed, which is based only on camera and/or LIDAR sensors.

According to another specific embodiment, the at least one sensor is monitored for ascertaining a performance by a separate artificial intelligence or by an existing artificial intelligence for a driving mode capable of being automated. The performance of a driving environment sensor may be monitored with the aid of an artificial intelligence that is already used for automated driving. For this purpose, the sensor data are processed by the respective artificial intelligence.

Alternatively or additionally, it is possible for a further artificial intelligence, which is implemented for example in the control unit, to be stored for implementing the method in the vehicle. The additional artificial intelligence may be operated for monitoring purposes in parallel to the artificial intelligence for automated driving.

According to another specific embodiment, the vehicle is switched to a safe state in the event that a deviation of the actual trajectory from the setpoint trajectory is determined.

Since the artificial intelligence was fundamentally tested for autonomous driving and was trained on the basis of a great many input data, it is initially possible to exclude an internal error within the artificial intelligence.

Alternatively or additionally, the vehicle may be switched to a safe state instead of executing the trajectory following the performance of a simulation. This may be implemented by a redundant sensor such as a GNSS sensor for example.

According to another specific embodiment, the setpoint trajectory is calculated in the vehicle by at least one control unit or outside the vehicle by a server unit, the vehicle-external setpoint trajectory being communicated to the vehicle via a car-to-x communication link. A car-to-car communication is understood as an exchange of information and data between vehicles. The goal of this data exchange is to inform the driver early of critical and dangerous situations. The respective vehicles collect data, such as ABS interventions, steering angle, position, direction and speed, and transmit these data by radio communication (according to WLAN, UMTS, LTE standards and the like) to the other road users. In the process, the "range of vision" of the driver is to be extended by electronic means. Car-to-infrastructure communication is understood as the exchange of data between a vehicle and the surrounding infrastructure (e.g., light signal systems). The mentioned technologies are based on the interaction of sensors of the various traffic partners. The car-to-x communication link is able to take both mentioned possibilities equally into account.

Additionally or alternatively, a respective artificial intelligence for degraded vehicle behavior may be downloaded from the cloud or the server unit and be executed in place of the usual artificial intelligence in the vehicle. Such an artificial intelligence may be stored for example for a vehicle variant within the cloud and is obtained by the vehicle preferably via the car-to-x communication link, after the vehicle has reported the defective sensors to the cloud.

According to another specific embodiment, at least one vehicle-internal or vehicle-external artificial intelligence performs a plausibilization of the actual trajectory. In particular for the case of a vehicle-external artificial intelligence, a planned trajectory of an autonomous vehicle may be transmitted in a foresighted manner in real time to a cloud via the car-to-x communication. In the cloud, the trajectory of the vehicle may be plausibilized with the aid of data of a highly precise map as well as on the basis of the current speed of the vehicle, the direction of travel and the vehicle dynamics.

The planned trajectory may preferably be checked in a simulation by an existing or an additional artificial intelligence, which executes the desired trajectory with the aid of a simulation model and subsequently compares the resulting position from the simulation with the map as well as other road users on the map.

In such a specific embodiment, the vehicle is able to be switched to a safe state from the cloud if at least one driving environment sensor exhibits a degraded performance. The check as to which sensor is defective may be performed within the cloud in that the sensor data or the already calculated trajectory of the artificial intelligence for autonomous driving are transmitted to the cloud and are evaluated there within the simulation. Again in step-by-step fashion, one driving environment sensor of the vehicle at a time is successively deactivated, and the reaction of the planned trajectory is checked within the simulation of the artificial intelligence. In a direct transmission of the sensor data, the planning or calculation of the trajectory occurs within an artificial intelligence in the cloud, it being possible for the result to be plausibilized within the artificial intelligence responsible for the simulation. This is expedient in particular when it is to be determined whether an error exists in the artificial intelligence of the vehicle and whether all driving environment sensors continue to work properly. In a transmission of the already calculated trajectories from the artificial intelligence of the vehicle it is also possible that only the trajectory itself is plausibilized by simulation within the cloud.

According to another specific embodiment, the sensor data of a defined time span are stored temporarily in a memory unit and are subsequently analyzed by the artificial intelligence for performing a plausibilization.

The data of the driving environment sensors of the vehicle may be stored temporarily in a vehicle memory for a specific duration such as 5 minutes for example. After the vehicle has been switched into a safe state, the sensor data from the vehicle memory are again transmitted to the artificial intelligence for autonomous driving, and the resulting trajectory is plausibilized by simulation with the aid of the artificial intelligence for the simulation of the trajectory. For this purpose, the respective artificial intelligence is always supplied with different sensor data, always at least one driving environment sensor being deactivated and the result being calculated by the artificial intelligence responsible for the simulation and being compared in multiple steps for all driving environment sensors. In this manner, it is possible to identify the driving environment sensor having a poor performance in a simple manner.

The trajectory that is plausible after taking the stored data into account, while precisely one specific driving environment sensor was deactivated in these calculations, provides the indication as to which driving environment sensor is defective or decreasing in its performance. For performing a check, it is possible to include again the respective driving environment sensor in the calculations and to compare the result with the calculations in the activated driving environment sensor. If there are jumps in position for example, then this is also an indication that the correct driving environment sensor having the poor performance was detected, which may now be permanently deactivated in a subsequent step. Alternatively or additionally, a warning or error report may be generated. The specific embodiment may alternatively be implemented within a cloud in that the respective sensor data that were temporarily stored in the vehicle are analyzed within the cloud using the method of this specific embodiment. For this purpose, the sensor data may previously be transmitted to the server unit or the cloud.

According to another specific embodiment, the sensor data are analyzed by the artificial intelligence in parallel to an implemented automated driving mode. The sensor data are analyzed in a parallel path of the artificial intelligence for autonomous driving by background calculations even during normal driving.

This occurs analogously in that always a specific driving environment sensor is excluded in the calculations of the trajectory and the resulting trajectory is simulated in the control unit with the aid of the artificial intelligence responsible for the simulation. In this manner, it is possible to identify and deactivate a driving environment sensor having a poorer performance nearly in real time.

The method of the present invention yields the following advantages:

Detecting a driving environment sensor that does not exhibit errors, but provides poor performance for automated driving, markedly increases safety in road traffic.

Using the artificial intelligence responsible for the simulation in the vehicle or in the cloud, it is possible to compare a planned trajectory for a specific vehicle variant already prior to implementation by the vehicle to a setpoint trajectory or to a desired behavior.

Successively switching off specific driving environment sensors yields a simple identification of the driving environment sensor having a degraded performance.

Because the sensor data of the driving environment sensors are stored for a certain time in a vehicle memory, it is possible to repeat the calculation of the trajectories by simulation for multiple activated or deactivated driving environment sensors in order to detect errors.

BRIEF DESCRIPTION OF THE DRAWINGS

Below, preferred exemplary embodiments of the present invention are explained in more detail with reference to highly simplified schematic representations shown in the figures.

DETAILED DESCRIPTION OF EXAMPLE EMBODIMENTS

Figure 1:
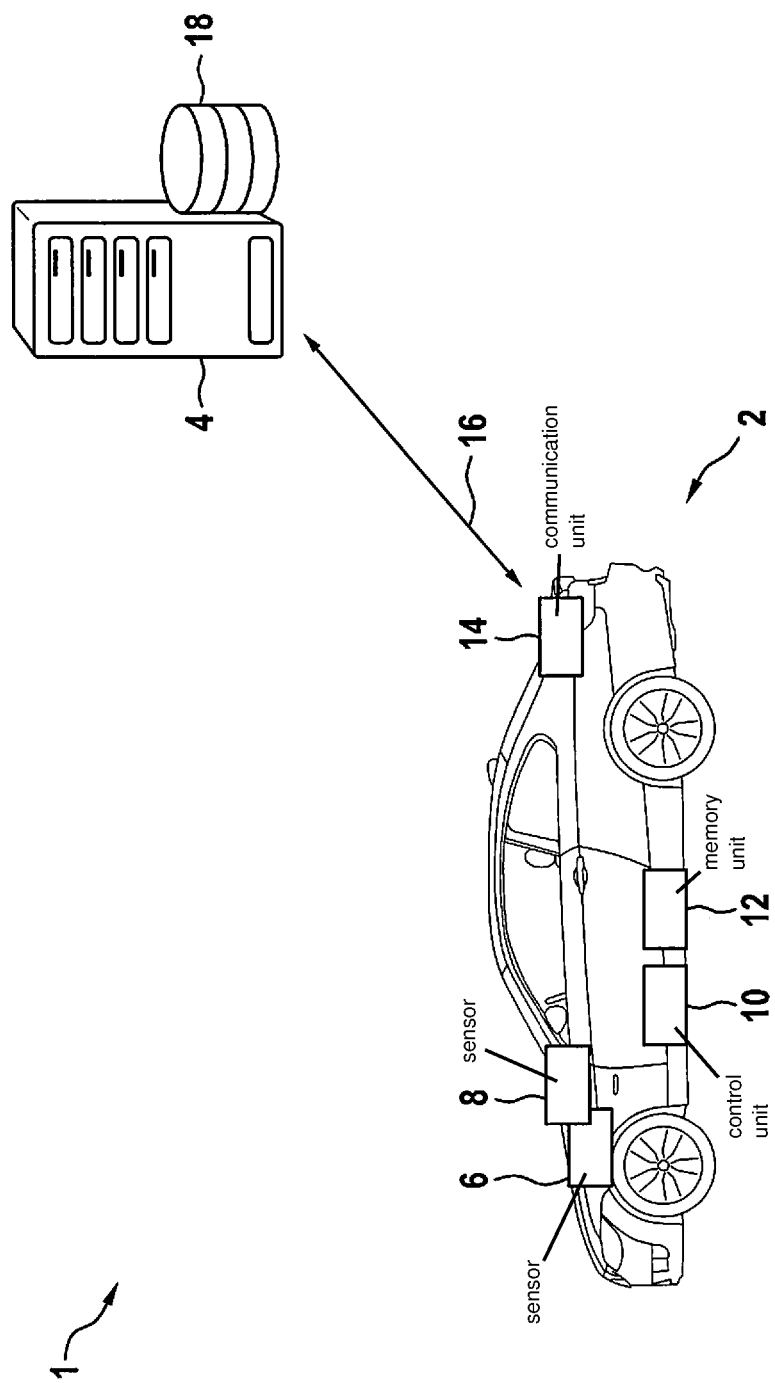
FIG. 1 shows a schematic representation of a system including a vehicle and a server unit external to the vehicle.

FIG. 1 shows a schematic representation of a system 1 including a vehicle 2 and a server unit 4 external to the vehicle.

Vehicle 2 has multiple sensors 6, 8. According to the exemplary embodiment, the two sensors 6, 8 are driving environment sensors, one sensor 6 being a radar sensor and the second sensor 8 being a GNSS sensor.

Sensors 6, 8 are connected to a control unit 10 for data transmission. An artificial intelligence is set up in control unit 10, which is able to calculate, simulate and analyze trajectories on the basis of the sensor data of sensors 6, 8.

Furthermore, control unit 10 is connected to a vehicle-side memory unit 12. This makes it possible temporarily to store the sensor data for a defined time span in memory unit 12.

Vehicle 2 has a communication unit 14. With the aid of communication unit 14, control unit 10 is able to establish a wireless communication link 16 to vehicle-external server unit 4 and to transmit data. Communication link 16 is in this case a car-to-x communication link 16 based on a mobile telephony standard.

Server unit 4 is designed as a cloud and has at least one memory 18. At least one artificial intelligence may likewise be stored in memory 18 and be executable by server unit 4. In particular, it is possible to establish a connection between server unit 4 and control unit 10 for exchanging data and for transmitting control instructions.

Figure 2:
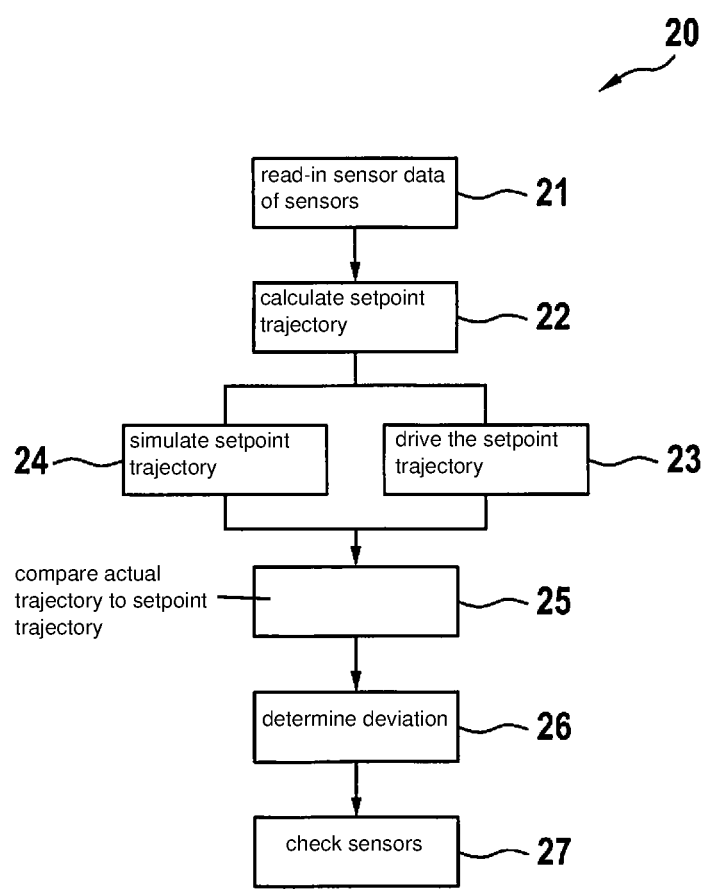
FIG. 2 shows a schematic flow chart for illustrating a method according to a specific embodiment of the invention.

FIG. 2 shows a schematic flow chart for illustrating a method 20 according to a specific embodiment of the present invention.

In particular, it is possible for the method to be implemented by system 1, by control unit 10 or external server unit 4.

In a step 21, the sensor data of sensors 6, 8 are read in by control unit 10. If required, the sensor data may be stored in memory unit 12 or be transmitted to server unit 4 via communication link 16.

In step 22, control unit 10 calculates a setpoint trajectory of vehicle 3.

Subsequently, vehicle 2 is able to drive 23 the setpoint trajectory. Alternatively, it is possible for an artificial intelligence to simulate 24 the setpoint trajectory on the basis of sensor data. The simulation may be performed on the basis of the sensor data. For this purpose, the artificial intelligence may be stored in control unit 10 or server unit 4.

In a further step 25, the actual trajectory driven by vehicle 2 or the simulated trajectory is compared to the setpoint trajectory.

If a deviation is determined 26 between the actual trajectory or the simulated trajectory and the setpoint trajectory, control unit 10 checks a performance of the at least one sensor 6, 8.

The check is performed 27 in such a way that each sensor 6, 8 of vehicle 2 is alternately deactivated and the setpoint trajectory is driven by vehicle 2 with the aid of at least one alternative sensor 6, 8 or is simulated by an artificial intelligence. This makes it possible to identify a sensor of reduced performance.

What is claimed is:

1. A method for a vehicle, comprising:
   calculating a setpoint trajectory of the vehicle;
   at least one processor (a) controlling the vehicle to drive in a manner by which the vehicle is to travel along the setpoint trajectory with the controlling resulting in an actual trajectory along which the vehicle travels, or (b) executing an artificial intelligence that simulates the drive in the manner by which the vehicle is to travel along the setpoint trajectory resulting in a simulated version of the actual trajectory;
   the at least one processor comparing the actual trajectory resulting from the drive or the simulation to the setpoint trajectory;
   based on the comparing, the at least one processor identifying a deviation between the compared actual trajectory from the setpoint trajectory;
   based on the identification of the deviation, the at least one processor checking respective performances of each of a plurality of sensors of the vehicle by performing the following for each of one or more of the plurality of sensors:
   deactivating the respective sensor;
   while the respective sensor is deactivated and all others of the plurality of sensors that have not been identified as being deficient are active:
   re-performing the controlling of the vehicle or the executing of the artificial intelligence to obtain a respective additional instance of the actual trajectory;
   comparing the respective additional instance of the actual trajectory to the setpoint trajectory; and
   determining whether a performance of the respective sensor is deficient based on a result of the respective comparison performed while the respective sensor is deactivated.

2. The method as recited in claim 1, wherein the performance of at least one of the plurality of sensors is determined to be deficient, and the method further comprises the at least one processor deactivating the at least one of the plurality of sensors whose performance has been determined to be deficient.

3. The method as recited in claim 1, wherein the vehicle is switched to a safe state in response to the identification of the deviation in response to which the checking of the respective performances of the each of the plurality of sensors is performed.

4. The method as recited in claim 1, wherein the setpoint trajectory is calculated in the vehicle.

5. The method as recited in claim 1, wherein at least one vehicle-internal or vehicle-external artificial intelligence is executed to perform a plausibilization of the actual trajectory.

6. The method as recited in claim 1, wherein sensor data of a defined time span are stored temporarily in a memory unit and are subsequently analyzed by the artificial intelligence being executed for performing a plausibilization.

7. The method as recited in claim 1, wherein he sensor data are analyzed for the checking of the respective performances, the analysis being performed by the artificial intelligence being executed in parallel to an implemented automated driving mode.

8. The method as recited in claim 1, wherein the setpoint trajectory is calculated by a server that is external to the vehicle and is communicated to the vehicle from the server via a car-to-x communication link.

9. A control unit for connecting to a plurality of sensors of a vehicle, the control unit comprising a processor that is configured to:
   calculate a setpoint trajectory of the vehicle;
   (a) control the vehicle to drive in a manner by which the vehicle is to travel along the setpoint trajectory with the control resulting in an actual trajectory along which the vehicle travels or (b) execute an artificial intelligence that simulates the drive in the manner by which the vehicle is to travel along driving of the setpoint trajectory resulting in a simulated version of the actual trajectory;
   compare the actual trajectory resulting from the drive or the simulation to the setpoint trajectory;
   based on the comparison, identify a deviation between the compared actual trajectory from the setpoint trajectory;

based on the identification of the deviation, check respective performances of each of the plurality of sensors by performing the following for each of one or more of the plurality of sensors:
   deactivating the respective sensor;
   while the respective sensor is deactivated and all others of the plurality of sensors that have not been identified as being deficient are active:
      re-performing the control of the vehicle or the execution of the artificial intelligence to obtain a respective additional instance of the actual trajectory;
      comparing the respective additional instance of the actual trajectory to the setpoint trajectory; and
      determining whether a performance of the respective sensor is deficient based on a result of the respective comparison performed while the respective sensor is deactivated.

10. A server unit having at least one non-transitory memory, the server unit configured to:
connect to a vehicle;
calculate a setpoint trajectory of the vehicle;
(a) control the vehicle to drive in a manner by which the vehicle is to travel along the setpoint trajectory with the control resulting in an actual trajectory along which the vehicle travels or (b) execute an artificial intelligence that simulates the drive in the manner by which the vehicle is to travel along the setpoint trajectory resulting in a simulated version of the actual trajectory;
compare the actual trajectory resulting from the drive or the simulation to the setpoint trajectory;
based on the comparison, identify a deviation between the compared actual trajectory from the setpoint trajectory;
based on the identification of the deviation, check respective performances of each of the plurality of sensors by performing the following for each of one or more of the plurality of sensors:
   deactivating the respective sensor;
   while the respective sensor is deactivated and all others of the plurality of sensors that have not been identified as being deficient are active:
      re-performing the control of the vehicle or the execution of the artificial intelligence to obtain a respective additional instance of the actual trajectory;
      comparing the respective additional instance of the actual trajectory to the setpoint trajectory; and
      determining whether a performance of the respective sensor is deficient based on a result of the respective comparison performed while the respective sensor is deactivated.

11. A non-transitory machine-readable storage medium on which is stored a computer program that is executable by a processor, that is executable by a control unit, and that, when executed by the control unit, causes the control unit to perform a method, the method comprising:
calculating a setpoint trajectory of the vehicle;
(a) controlling the vehicle to drive in a manner by which the vehicle is to travel along the setpoint trajectory with the controlling resulting in an actual trajectory along which the vehicle travels, or (b) executing artificial intelligence of the program that simulates the drive in the manner by which the vehicle is to travel along the setpoint trajectory resulting in a simulated version of the actual trajectory;
comparing the actual trajectory resulting from the drive or the simulation to the setpoint trajectory;
based on the comparing, identifying a deviation between the compared actual trajectory from the setpoint trajectory;
based on the identification of the deviation, checking respective performances of each of a plurality of sensors of the vehicle by performing the following for each of one or more of the plurality of sensors:
   deactivating the respective sensor;
   while the respective sensor is deactivated and all others of the plurality of sensors that have not been identified as being deficient are active:
      re-performing the controlling of the vehicle or the executing of the artificial intelligence of the program to obtain a respective additional instance of the actual trajectory;
      comparing the respective additional instance of the actual trajectory to the setpoint trajectory; and
      determining whether a performance of the respective sensor is deficient based on a result of the respective comparison performed while the respective sensor is deactivated.

12. A control unit comprising at least one processor, wherein the at least one processor is configured to perform a method for a vehicle, the method comprising:
calculating a setpoint trajectory of the vehicle;
controlling the vehicle to drive according to the setpoint trajectory or executing artificial intelligence to simulate the drive according to the setpoint trajectory, thereby obtaining an actual trajectory;
comparing the actual trajectory to the setpoint trajectory; and
in an event that a result of the comparing is that there is a deviation of the actual trajectory from the setpoint trajectory, checking a performance of at least one of a plurality of sensors of the vehicle by:
   alternately deactivating each of the plurality of sensors; and
   for each alternation, using at least alternative one of the sensors, other than the deactivated sensor to control the vehicle to drive according to the setpoint trajectory or to execute the artificial intelligence to simulate the drive according to the setpoint trajectory.

\* \* \* \* \*